(12) United States Patent
Granata

(10) Patent No.: US 6,857,809 B2
(45) Date of Patent: Feb. 22, 2005

(54) ARTICULATING FASTENER ASSEMBLY

(76) Inventor: Robert Granata, 2674 Amberly La., Troy, MI (US) 48084

( * ) Notice: Subject to any disclaimer, the term of this patent is extended or adjusted under 35 U.S.C. 154(b) by 135 days.

(21) Appl. No.: 10/113,300

(22) Filed: Mar. 29, 2002

(65) Prior Publication Data

US 2002/0197107 A1 Dec. 26, 2002

Related U.S. Application Data

(60) Provisional application No. 60/280,059, filed on Mar. 30, 2001.

(51) Int. Cl.[7] .................................................. B60J 7/00
(52) U.S. Cl. ........................ 403/121; 403/137; 296/214
(58) Field of Search ................................ 463/121, 122, 463/128, 135, 137, 142, 144

(56) References Cited

U.S. PATENT DOCUMENTS

| | | |
|---|---|---|
| 3,953,067 A | 4/1976 | Isola |
| 4,175,785 A | 11/1979 | Leiter |
| 4,352,522 A | 10/1982 | Miller |
| 4,466,655 A | 8/1984 | Baba et al. |
| 4,610,478 A | 9/1986 | Tervol |
| 4,899,975 A | 2/1990 | Suman |
| 4,923,244 A | 5/1990 | Clenet |
| 4,946,225 A | 8/1990 | Jardin |
| 4,981,323 A | 1/1991 | Dowd et al. |
| 5,082,323 A | 1/1992 | Dowd et al. |
| 5,186,517 A | 2/1993 | Gilmore et al. |
| 5,280,991 A | 1/1994 | Weiland |
| 5,657,598 A * | 8/1997 | Wilbs et al. ............. 403/122 X |
| 5,754,664 A | 5/1998 | Clark et al. |
| 5,755,526 A * | 5/1998 | Stanevich .................... 403/122 |
| 5,795,015 A | 8/1998 | Corpe et al. |
| 5,845,458 A | 12/1998 | Patel |
| 5,876,084 A | 3/1999 | Smith et al. |
| 6,309,013 B1 | 10/2001 | Staltmayer et al. |
| 6,343,888 B1 * | 2/2002 | Huhn et al. ............. 403/122 X |
| 6,527,468 B1 * | 3/2003 | Lindquist et al. ........... 403/122 |

* cited by examiner

Primary Examiner—John Cottingham
(74) Attorney, Agent, or Firm—Bliss McGlynn, P.C.

(57) ABSTRACT

A fastener assembly for securely fastening a decorative panel in spaced relation to a support backing includes a base member adapted to be operatively mounted to the decorative panel, a carrier member, and a linking member operatively extending between the base member and the carrier member such that the base member is disposed spaced from the carrier member. A fastening medium is supported by the carrier member and adapted to operatively interconnect the carrier member to the support backing. The linking member operatively interconnects the base member and the carrier member in articulating fashion such that the base member is transversely moveable relative to the carrier member.

32 Claims, 9 Drawing Sheets

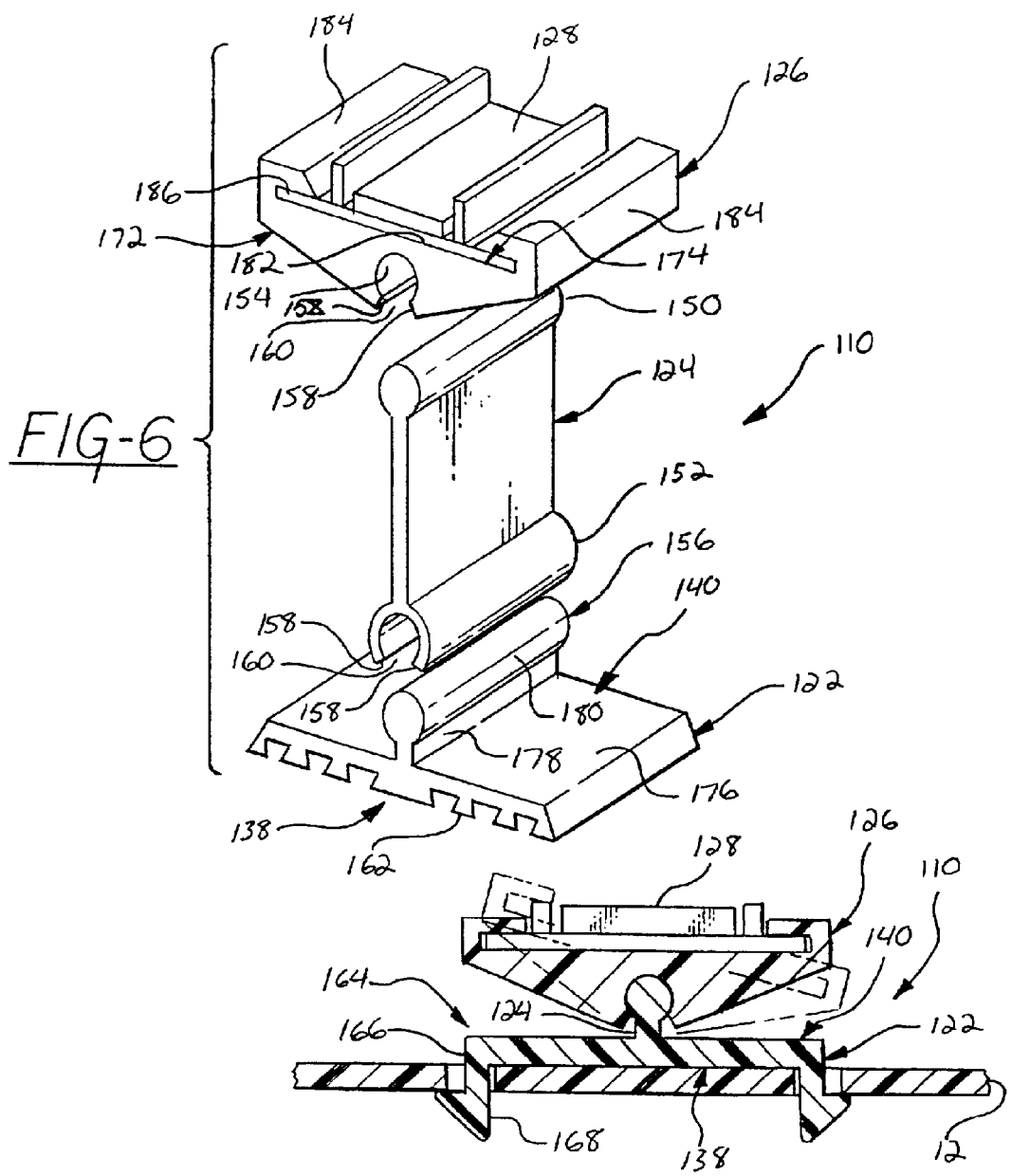
FIG-6
FIG-7
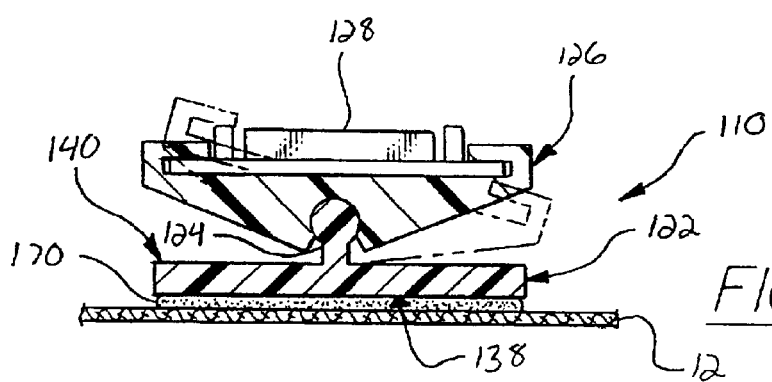
FIG-8

ARTICULATING FASTENER ASSEMBLY

CROSS REFERENCE TO RELATED APPLICATIONS

This application claims the benefit of U.S. provisional patent application entitled "Dual-Pivoting Magnet-Carrier Fastener Assembly," having Ser. No. 60/280,059, and filed on Mar. 30, 2001.

BACKGROUND OF THE INVENTION

1. Field of the Invention

The present invention relates, generally, to fasteners and, more particularly, to articulating, pivoting, variable-spacing fasteners.

2. Description of the Related Art

It is known in the related art to use a panel-mounting fastener assembly for attaching a decorative panel of a vehicle, such as an automobile, to an overlying or underlying sheet-metal support member. The decorative panel may include a headliner, a door panel, a seat-back panel, or other panels typically having a support backing onto which there is bonded decorative material. The decorative panel may include a resinous-impregnated fibrous-bat material for the support backing and foam-backed upholstery for the decorative material. When the decorative panel includes a headliner, the sheet-metal support member may be a roof beam extended across the roof of the vehicle for providing rigidity to the sheet-metal support member and mounting structure for the headliner.

More specifically, the headliner substantially spans the entire upper surface of the passenger compartment of the vehicle. The sheet metal is disposed coextensively with and adjacent the headliner opposite the passenger compartment, to define substantially the entire interior surface of the roof of the vehicle body. The headliner is assembled to the vehicle body by attaching the headliner to the sheet metal via a plurality of fasteners. In the assembled state, each fastener mounts a predetermined area of the surface of the headliner to an adjacent part of the sheet metal. This predetermined area may be referred to as the attachment area of the headliner. The adjacent portion of the sheet metal that corresponds to the attachment area of the headliner may be referred to as the attachment area of the sheet metal.

Fasteners previously used to attach the headliner to the sheet metal included screws and plastic push-pins. However, these fasteners suffered from several problems. For instance, once the screws and push-pins were installed, the heads thereof were often visible to passengers within the passenger compartment and, thus, aesthetically undesirable. Also, the screws and push-pins and the tools used to assemble them to the headliner damaged the headliner by creating holes through the headliner and stray marks on the surface of the headliner. Moreover, during assembly of the headliner, a hole formed in the sheet metal, but hidden from view, had to be located by feel as the assembler attempted to align the hole with the corresponding hole from the headliner. The assembler then had to insert a screw or push-pin into the hole. This effort was time-consuming and cumbersome. Furthermore, due to the extended labor and time involved in attaching and unattaching the headliner and sheet metal using these fasteners, the cost to repair the headliner was substantial as well.

In a variant of the type of fastener assembly just described, on the surface of the headliner was mounted an elongated holder defining a track for receiving, at any number of a plurality of spaced locations thereon, one or a plurality of mounting clips. Once secured to the holder, the mounting clip(s) allowed snap-fitting of the headliner to an aperture or apertures in the sheet metal. However, this fastener assembly suffered from the same problems described in connection with screws and push-pins.

To overcome these problems, VELCRO and other, much stronger DUAL LOCK fasteners were used. These fasteners generally included an attaching piece that was mounted to the attachment area of the headliner. A receiving piece was similarly mounted to a corresponding area of the opposed sheet metal. The attaching and receiving pieces were mounted to form a fastening mechanism between the headliner and the sheet metal forming the body of an automotive vehicle. More specifically, the attaching piece of the VELCRO fastener, for example, included an adhesive backing. The adhesive backing was used to mount the VELCRO fastener to the headliner or sheet metal. When positioning the headliner adjacent the sheet metal during the mounting operation, it was necessary for the attaching and receiving area on the corresponding assemblies to be properly aligned with each other to facilitate proper mounting of the headliner to the sheet metal.

Although these fasteners were not aesthetically undesirable and eliminated the need to "locate by feel" during installation, several problems remained unsolved. For instance, the attaching and receiving pieces of the VELCRO or DUAL LOCK fastener were typically mounted on the headliner and sheet metal, respectively, prior to assembly of the headliner. Thus, proper alignment and engagement of the attaching and receiving pieces with and to each other depended upon proper prior disposition on the headliner and sheet metal, respectively. The continuity of such alignment and engagement from vehicle to vehicle in the assembly of the headliner also depended upon the structure of the headliner and roof of the vehicle body, in general, and the appropriate surface of the sheet metal, in particular, being consistent from vehicle to vehicle. Furthermore, direct pressure had to be manually applied to the attaching piece against the receiving piece for approximately thirty seconds to ensure adherence of any adhesive backing to the receiving piece. From an ergonomics perspective, then, these fasteners were problematic. And, apart from ergonomics, the DUAL LOCK fastener was unable to articulate and, thus, conform to the contour of the sheet-metal surface.

To overcome these problems, the use of magnets as a fastening mechanism was introduced. In one example, a relatively small, substantially rectangularly shaped magnet was supported on a foam pad mounted on a carrier. In turn, the carrier included an injection-molded base. The magnet, carrier, and base together comprised a fastener relative to the opposed sheet metal.

To assemble the headliner, many of these fasteners were strategically disposed on the appropriate surface, or substrate, of the headliner. Then, the fasteners were moved toward the sheet metal with the faces of the magnets substantially parallel with the sheet metal. The magnets were magnetically attracted to the sheet metal to sufficiently mount the headliner to the sheet metal. However, the roof of an automotive-vehicle body is generally curved, and the carrier and the base did not permit the fastener to conform to the contour of a curved sheet-metal surface.

Despite the advantages over its predecessors, this fastener still posed some problems. For example, as more and more headliners become modular, ductwork, wiring components, and other components are supported between the headliner and the sheet-metal roof of the vehicle body. These components require space between the sheet metal and the headliner. The amount of space separating the headliner and the sheet metal is a design consideration in the manufacture of the vehicle that varies from vehicle to vehicle. These variations resulted in increased tooling costs for fasteners of this type.

Accordingly, there remains a need in the related art for a fastener that articulates such that the fastener can conform to the contour of a curved sheet-metal surface, pivots such that the attachment area of the headliner can be attached to the attachment area of the sheet metal at varying angles, and accommodates a varying space presented between the headliner and the sheet metal in the assembled state of the headliner, but does not stretch under the influence of heat.

SUMMARY OF THE INVENTION

The present invention overcomes the disadvantages in the related art in a fastener assembly for securely fastening a decorative panel in spaced relation to a support backing. The fastener assembly includes a base member adapted to be operatively mounted to the decorative panel, a carrier member, and a linking member operatively extending between the base member and the carrier member such that the base member is disposed spaced from the carrier member. A fastening medium is supported by the carrier member and adapted to operatively interconnect the carrier member to the support backing. The linking member operatively interconnects the base member and the carrier member in articulating fashion such that the base member is transversely moveable relative to the carrier member.

One advantage of the articulating fastener assembly of the present invention is that it is not visible to passengers within the passenger compartment of the vehicle when the headliner is in the assembled state and, thereby, facilitates an automotive headliner that is aesthetically pleasing.

Another advantage of the articulating fastener assembly of the present invention is that it does not damage the headliner during assembly and disassembly thereof.

Another advantage of the articulating fastener assembly of the present invention is that it makes assembling and disassembling the headliner less time-consuming and require less labor, thereby reducing manufacturing, service, and warranty costs.

Another advantage of the articulating fastener assembly of the present invention is that it articulates such that it can conform to the contours of the headliner and the sheet metal.

Another advantage of the articulating fastener assembly of the present invention is that it pivots to accommodate the structure of the sheet-metal roof at varying angles.

Another advantage of the articulating fastener assembly of the present invention is that it accommodates varying spaces presented between the headliner and the sheet metal.

Another advantage of the articulating fastener assembly of the present invention is that it does not stretch under the influence of heat.

Another advantage of the articulating fastener assembly of the present invention is that it prevents the headliner from sagging in the assembled state thereof.

Another advantage of the articulating fastener assembly of the present invention is the modularity of the base member, linking member, and carrier member.

Another advantage of the articulating fastener assembly of the present invention is the use of neodymium magnets, which provide significantly more strength than flexible, extruded magnets.

Another advantage of the articulating fastener assembly of the present invention is that it provides superior serviceability (relative to the VELCRO/DUAL LOCK fasteners).

Another advantage of the articulating fastener assembly of the present invention is that it provides for easier assembly of the headliner, i.e., does not require a male/female or hook-and-loop structural relationship.

Another advantage of the articulating fastener assembly of the present invention is that it does not require the use of pressure-sensitive adhesives, which typically cannot hold-up to the new, higher heat requirements of 95° C.

Another advantage of the articulating fastener assembly of the present invention is that it, with the exception of the bond thereof to the headliner, is entirely mechanical and can pass all heat requirements.

Other objects, features, and advantages of the present invention will be readily appreciated as the same becomes better understood while reading the subsequent description when taken in conjunction with the accompanying drawings.

BRIEF DESCRIPTION OF THE DRAWINGS

FIG. 6 is an exploded perspective view of the articulating fastener assembly of the present invention shown in FIG. 4 illustrating the base member, linking member, and carrier member of the articulating fastener assembly in the unassembled state thereof;

FIG. 7 is a partial cross-sectional side view of another embodiment of the articulating fastener assembly of the present invention illustrating the clip legs of the articulating fastener assembly in the assembled state thereof fastened to a substrate;

FIG. 8 is a partial cross-sectional side view of another embodiment of the articulating fastener assembly of the present invention illustrating the use of adhesive to mount the articulating fastener assembly in the assembled state thereof to a headliner;

DESCRIPTION OF THE PREFERRED EMBODIMENT(S)

The present invention overcomes the disadvantages in the related art in an articulating fastener assembly (fastener assembly) for securely fastening a decorative panel in spaced relation to a support backing. The fastener assembly is described below and shown in the figures in connection with attaching a headliner (a decorative panel) of the passenger compartment of an automotive vehicle to the interior surface of sheet metal (a support backing) of the roof of the body of the automotive vehicle using a magnet as a fastening medium. However, those having ordinary skill in the art will appreciate that the fastener assembly may be used in connection with attaching any two articles of suitable size, shape, and material together with other fastening media, like the VELCRO or DUAL LOCK fasteners. Such uses include a pivoting picture frame mounted to a refrigerator, a pivoting document holder used during word-processing, and a pivoting phone-holder for a vehicle, just to name a few. Accordingly, it will be understood that the present invention is in no way limited by the context of the preferred embodiments of the present invention disclosed herein.

Figure 1:
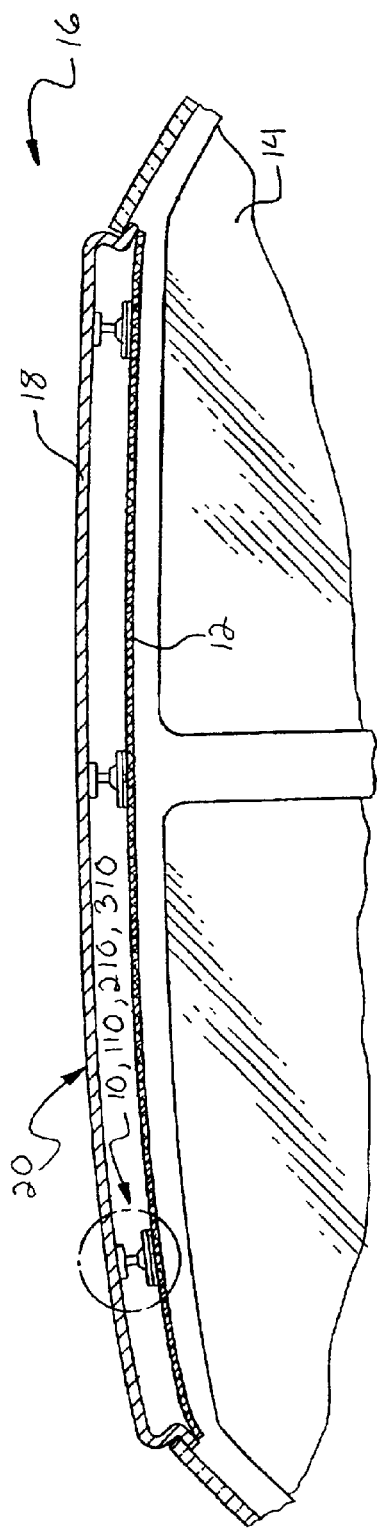
FIG. 1 is an environmental cross-sectional side view of a preferred embodiment of the articulating fastener assembly of the present invention illustrating one possible disposition of the articulating fastener assembly relative to a headliner and the sheet metal of a motor vehicle.

A fastener assembly according to the present invention is generally indicated at 10, 110, 210, and 310 in FIGS. 1–19, where like numerals are used to designate like structure throughout the various embodiments disclosed herein. Referring initially to FIG. 1, the upper portion of an automotive vehicle is generally indicated at 16. The automotive vehicle is schematically represented and is shown having a passenger compartment 14 or enclosure that is defined by the interior sheet-metal surface 18 of the roof, generally indicated at 20, of the vehicle 16. In FIG. 1, a plurality of fastener assemblies 10, 110, 210, 310 are shown attaching a headliner 12 of the passenger compartment 14 to the interior surface 18 of the roof 20. The fastener assemblies 10, 110, 210 and 310 are specifically designed to mount the headliner 12 in spaced relationship with respect to the interior surface 18 of the roof 20. In this way, ductwork wiring and other automotive-related components can be easily accommodated in the space presented between the interior surface 18 and the headliner 12.

Figure 2:
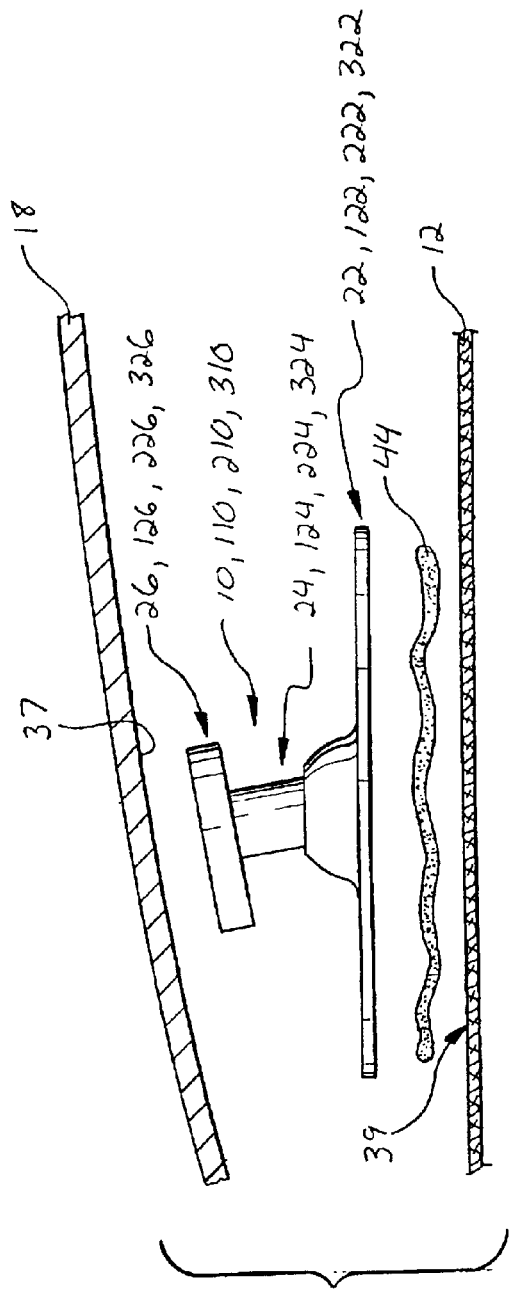
FIG. 2 is an exploded perspective view of one embodiment of the articulating fastener assembly of the present invention shown in FIG. 1 illustrating the base member, linking member, and carrier member of the articulating fastener assembly in the unassembled state of the headliner.

With reference to the embodiment illustrated in FIG. 2 and in its most basic form, the fastener assembly 10, 110, 210, 310 includes a base member, generally indicated at 22, 122, 222, 322, a linking member, generally indicated at 24, 124, 224, 324, a carrier member, generally indicated at 26, 126, 226, 326, and a fastening medium 28, 128, 228, 328. The base member 22, 122, 222, 322 is adapted to be operatively mounted to the headliner 12. The linking member 24, 124, 224, 324 operatively extends between the base member 22, 122, 222, 322 and the carrier member 26, 126, 226, 326 such that the base member 22, 122, 222, 322 is disposed spaced from the carrier member 26, 126, 226, 326. The fastening medium 28, 128, 228, 328 is supported by the carrier member 26, 126, 226, 326 and adapted to operatively interconnect the carrier member 26, 126, 226, 326 to the sheet metal 18. The linking member 24, 124, 224, 324 operatively interconnects the base member 22, 122, 222, 322 and the carrier member 26, 126, 226, 326 in articulating fashion such that the base member 22, 122, 222, 322 is transversely moveable relative to the carrier member 26, 126, 226, 326.

Preferably, the base member 22, 122, 222, 322 and/or the carrier member 26, 126, 226, 326 is adapted to swivel through varying angles with respect to the linking member 24, 124, 224, 324. Those having ordinary skill in the art will appreciate that there is a number of mechanical arrangements that will produce articulating movement among the base member 22, 122, 222, 322, the linking member 24, 124, 224, 324, and the carrier member 26, 126, 226, 326. Thus, while there are four different embodiments disclosed herein, those having ordinary skill in the art will appreciate that, within the scope of the appended claims, other means of providing the articulating movement may be possible without departing from the present invention. Accordingly, the various embodiments of the present invention illustrated in the figures will be described in greater detail below.

More specifically and referring now to FIGS. 3 and 3A–3C, the structure of the fastener assembly 10 will be addressed. In this embodiment, the linking member 24 may include a pair of distal ends. One of the distal ends may include a male end portion 30 or a female end portion 32. The base member 22 or the carrier member 26 defines a corresponding female portion 34 or a corresponding male portion 36. The male end portion 30 is adapted to be received in the female portion 34, and the female end portion 32 is adapted to receive the male portion 36 such that the linking member 24 interconnects the base member 22 and the carrier member 26 in articulating fashion.

FIGS. 3 and 3A–3C show a preferred embodiment of the fastener assembly 10 having swiveling characteristics. In this embodiment, the linking member 24 includes a pair of distal ends. One or both of the distal ends defines a ball 30, and the base member 22 and/or the carrier member 26 defines a corresponding socket 34. The ball 30 is adapted to be complimentarily received in the socket 34 to provide swiveling articulation of the base member 22 relative to the carrier member 26.

Alternatively, the linking member 24 can include a pair of distal ends, wherein one or both of the distal ends defines a socket 32 and the base member 22 and/or the carrier member 26 defines a corresponding ball 36. The socket 32 is adapted to complimentarily receive the ball 36 to provide swiveling articulation of the base member 22 relative to the carrier member 26.

Alternatively, the linking member 24 can include a pair of distal ends wherein one distal end defines a ball 30 and the other distal end defines a socket 32. One of the base member 22 or the carrier member 26 defines a corresponding socket 34, and the other base member 22 or carrier member 26 defines a ball 36. The ball 30 of the linking member 24 is adapted to be complimentarily received in the corresponding socket 34, and the socket 32 of the linking member 24 is adapted to complimentarily receive the corresponding ball 36 to provide swiveling articulation of the base member 22 relative to the carrier member 26.

In each of these three alternatives and as shown in FIGS. 3 and 3A–3C, the linking member 24 is of a substantially cylindrical shape. The linking member 24 defines a ball 30 at the distal end of the linking member 24 proximate the base member 22.

Figure 3:
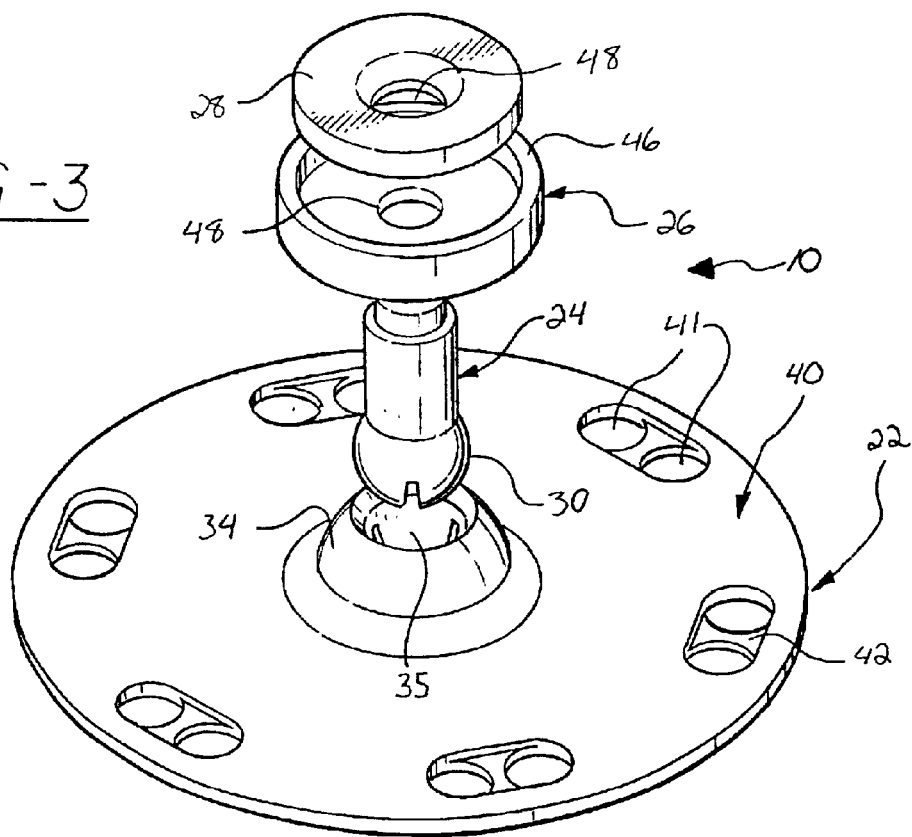
FIG. 3 is an exploded perspective view of the articulating fastener assembly of the present invention shown in FIG. 2 illustrating the base member, linking member, carrier member, and magnet of the articulating fastener assembly in the unassembled state thereof.
Figure 3A:
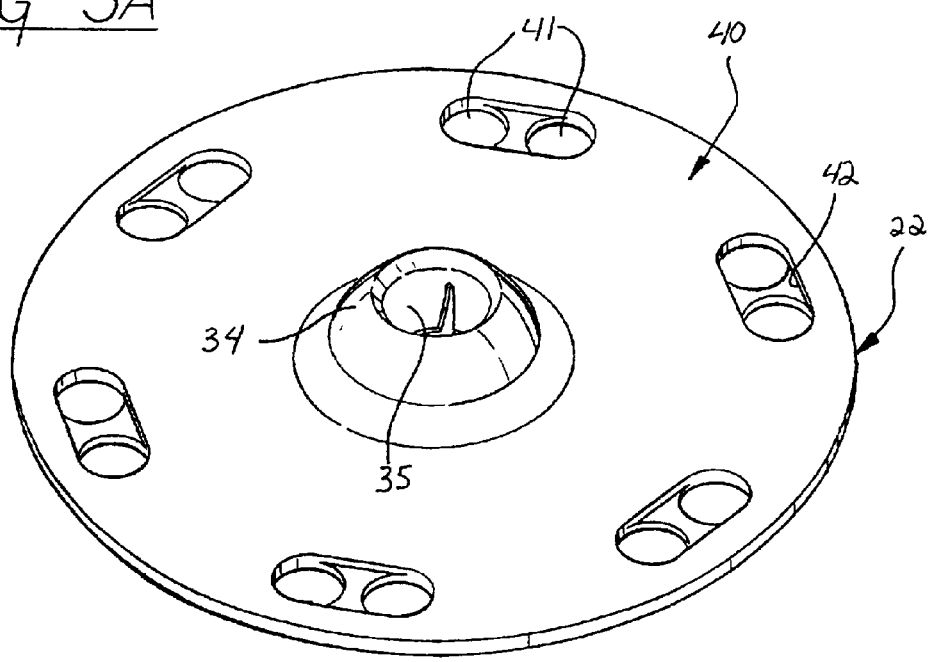
FIG. 3A is a top elevational view of the base member of the articulating fastener assembly of the present invention shown in FIG. 3.
Figure 3B:
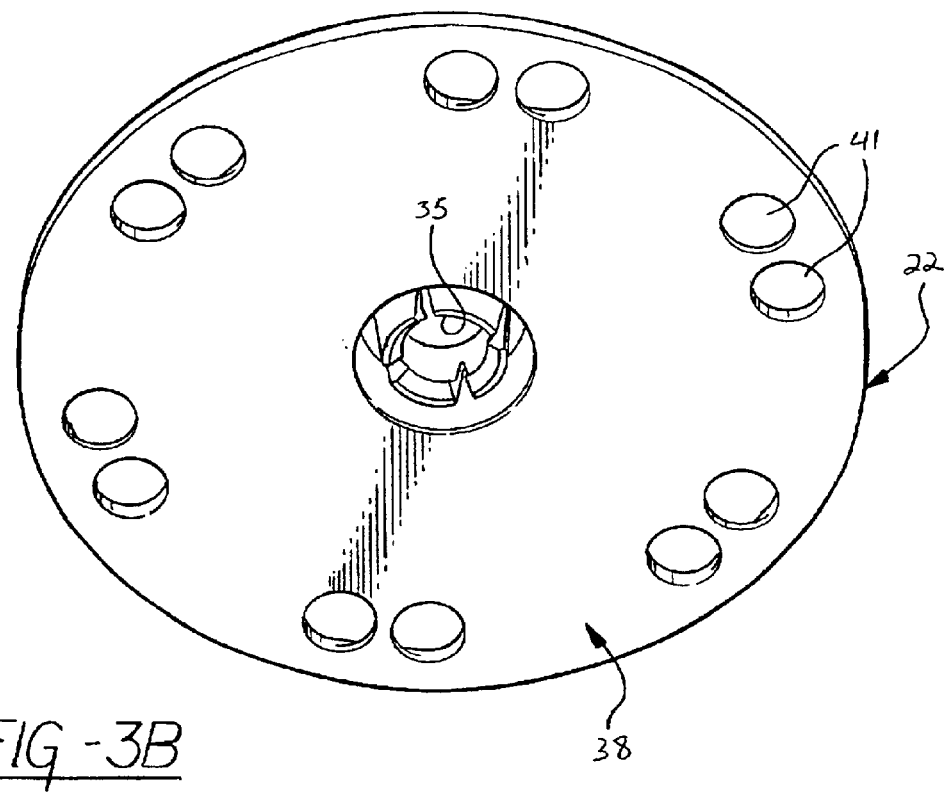
FIG. 3B is a bottom elevational view of the base member of the articulating fastener assembly of the present invention shown in FIG. 3.

As best shown in FIGS. 3, 3A, and 3B, the base member 22 is of a substantially circular shape and defines an attaching face, generally indicated at 38, and a linking face, generally indicated at 40. The base member 22 is adapted to be mounted to an attachment area, which is generally indicated at 39 in FIG. 2, of the headliner 12. To that end, the base member 22 has a plurality of uniform sets of holes 41 and scallops 42 disposed substantially equidistantly about the approximate periphery of the base member 22 to permit hot-melt glue 44, best shown in FIG. 2, to flow not only through, but also around, the holes 41 into the area or volume defined between the scallops 42.

As best shown in FIGS. 3, 3A, and 3B, the socket 34 or the ball 36 is defined on a substantially central area of the linking face 40 of the base member 22. In these figures, the base member 22 defines a socket 34. The socket 34 extends above the linking face 40 of the base member 22. The socket 34 is adapted to prevent the ball 30 of the linking member 24 from extending through the attaching face 38 of the base member 22. To this end and as best shown in FIG. 3B, the socket 34 may be defined by a plurality of depending fingers 35 that are adapted to engage and retain the ball 30 in snap-fit relation such that the linking member 24 may articulate relative to the base member 22.

Figure 3C:
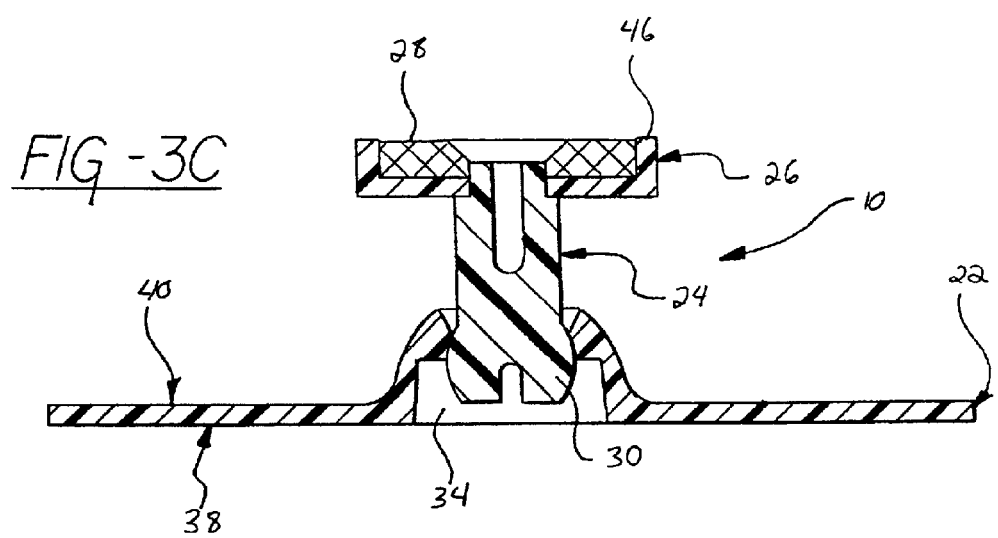
FIG. 3C is a cross-sectional side view of the articulating fastener assembly of the present invention shown in FIG. 3 illustrating the structural relationship of the base member and linking member of the articulating fastener assembly in the assembled state thereof.

As best shown in FIG. 3, in one preferred embodiment, the carrier member 26 is substantially circular and has a diameter substantially smaller than that of the base member 22. Also, as best shown in FIGS. 3 and 3C, the carrier member 26 includes a rim 46 defining a channel interiorly to said rim 46 and surrounding the fastening medium 28. In the preferred embodiment described herein and illustrated throughout the figures, the fastening medium is a magnet 28. However, as will be appreciated from the description that follows, the fastening medium 28 may include any suitable mechanism for adhering the carrier member 26 to the interior surface 18 of the roof 20 of the vehicle 16. The carrier member 26 and the magnet 28 define aligned apertures 48 in a substantially central area thereof adapted to receive the distal end of the linking member 24 opposite the ball 30 of the linking member 24.

To assemble the fastener assembly 10 to the headliner 12, the base member 22 is hot-melt glued to the attachment area of the headliner 12 such that the glue 44 flows through and around the holes 41 and in the scallops 42. This flow essentially forms rivets in the holes 41 to secure the fastener assembly 10 to the headliner 12.

Those having ordinary skill in the art will appreciate that the base member 22 and the carrier member 26 of this embodiment can have any suitable size and shape. Furthermore, the fastener assembly 10 of this embodiment can be assembled to the headliner 12 by any suitable means. Those having ordinary skill in the art will also appreciate that the carrier member 26 of this embodiment can support the magnet 28 by any suitable means.

Figure 5:
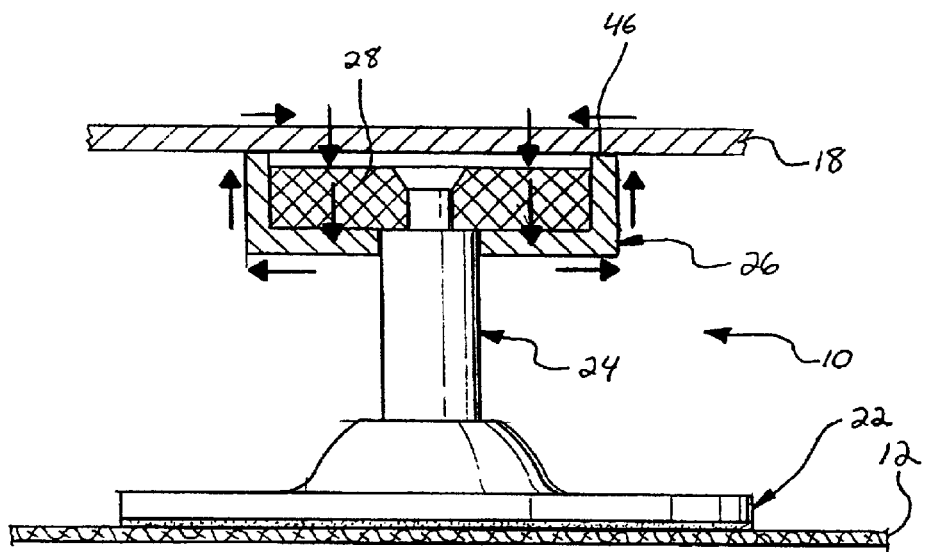
FIG. 5 is a cross-sectional side view of the articulating fastener assembly of the present invention shown in FIG. 4 illustrating the magnetic-flux path of a magnet of the articulating fastener assembly in the assembled state of the headliner.

Referring now to FIG. 5, it can be seen that the magnet 28 generates a magnetic flux that attracts the carrier member 26 to the sheet metal 18. The magnetic flux has a magnetic-flux path that travels through the rim 46, through the sheet metal 18, through the magnet 28, and back through the central area of the carrier member 26.

The carrier member 26 and the linking member 24 may be disposed substantially perpendicularly to each other while the base member 22 and the carrier member 26 may be disposed substantially parallel with each other. However, the linking member 24 can pivot through continuously varying angles. In this manner, the carrier member 26 can be attached to the attachment area, which is generally indicated at 37 in FIG. 2, of the sheet metal 18 at varying angles in relation to the linking member 24.

Referring to FIGS. 4 and 6–12, another preferred embodiment of the fastener assembly, having pivoting characteristics, is generally indicated at 110. Similar or like parts of the fastener assembly 110 have similar or like reference numerals with respect to the fastener assembly 10 increased by a factor of one hundred (100). Thus, the fastener assembly 110 includes a base member 122, a carrier member 126, and a linking member 124 extending therebetween and adapted to dispose the base member 122 and the carrier member 126 in spaced relationship with respect to each other.

As best shown in FIG. 6, the linking member 124 may include a pair of distal ends, wherein one distal end includes a male end portion 130 or a female end portion 132 and the other distal end includes a male end portion 130 or a female end portion 132. Each of the base member 122 and the carrier member 126 defines a corresponding female portion 134 or a corresponding male portion 136. The male end portion 130 is adapted to be received in the female portion 134, and the female end portion 132 is adapted to receive the male portion 136 such that the linking member 124 interconnects the base member 122 and the carrier member 126 in articulating fashion.

Where the linking member 124 includes a pair of distal ends, one distal end may include a rod portion 150 or a groove portion 152, and the base member 122 or the carrier member 126 defines a complimentary female portion 154 or a complimentary male portion 156. The rod portion 150 is adapted to be received in the female portion 154, and the groove portion 152 is adapted to receive the male portion 156 such that the linking member 124 interconnects the base member 122 and the carrier member 126 in articulating fashion.

Alternatively, the linking member 124 can include a pair of distal ends, wherein one distal end includes a rod portion 150 or a groove portion 152 and the other distal end includes a rod portion 150 or a groove portion 152. Each of the base member 122 and the carrier member 126 defines a complimentary female portion 154 or a complimentary male portion 156. The rod portion 150 is adapted to be received in the female portion 154, and the groove portion 152 is adapted to receive the male portion 156 such that the linking member 124 interconnects the base member 122 and the carrier member 126 in articulating fashion.

In each of the alternatives and as best shown in FIG. 6, the groove portion 152 of the linking member 124 or the female portion 154 of the base member 122 and/or the carrier member 126 defines a pair of stop portions 158 such that the corresponding base member 122 and/or the corresponding carrier member 126 can articulate through continuously varying angles between the stop portions 158. More specifically, the groove portion 152 of the linking member 124 or the female portion 154 of the base member 122 and/or the carrier member 126 includes a longitudinally extending circumferential opening 160 that defines the pair of stop portions 158. The longitudinal extent of the rod portion 150 of the linking member 124 or the groove portion 152 of the linking member 124 defines an axis about which the corresponding base member 122 and/or the corresponding carrier member 126 can articulate.

Figure 9:
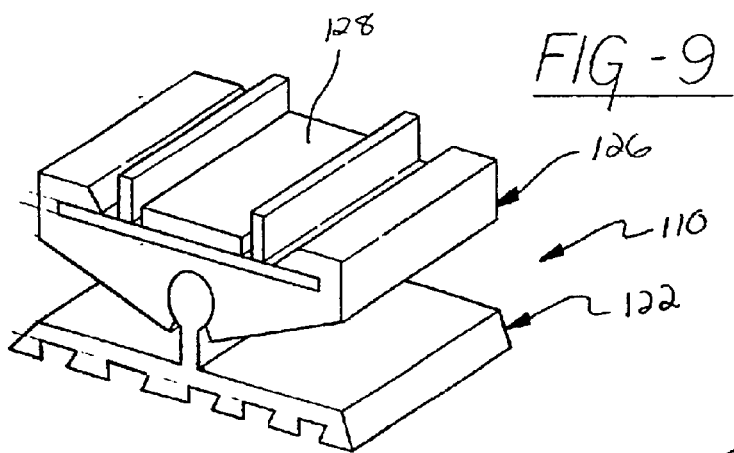
FIG. 9 is a perspective view of the articulating fastener assembly of the present invention shown in FIGS. 4–6 illustrating the articulating feature thereof.
Figure 10:
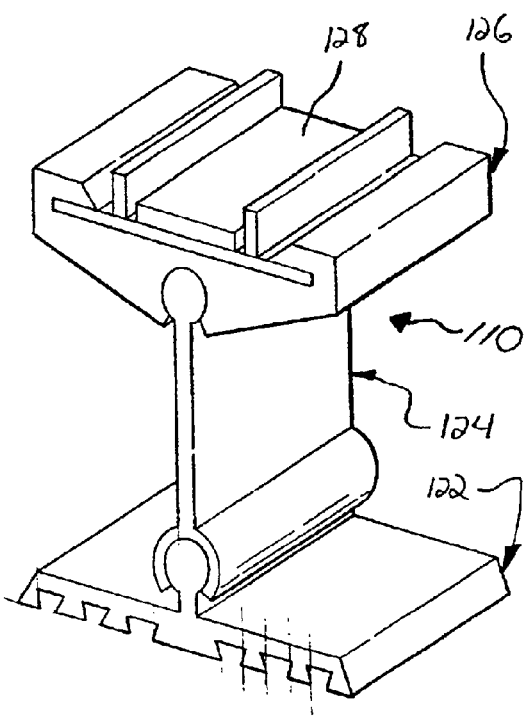
FIG. 10 is a perspective view of the articulating fastener assembly of the present invention shown in FIGS. 4–6 illustrating the articulating feature thereof.

In this manner, the base member 122 can be mounted to the attachment area 39 of the headliner 12 at varying angles in relation to the linking member 124. Also and as shown in FIGS. 9 and 10, the carrier member 126 can articulate longitudinally with respect to the linking member 124 such that the carrier member 126 can conform to the contour of the sheet metal 18.

As best shown in FIGS. 7, 8, 11, and 12, the extent of pivoting and articulation can be varied by narrowing and enlarging the opening 160 defining the pair of stop portions 158. The extent of pivoting and articulation can be varied also by adding stoppers, shoulders, or the like to the groove portion 152 of the linking member 124 or the male portion 156 of the base member 122 and/or the carrier member 126 of various sizes to limit the range of pivotal and articulating motion of the linking member 124.

As best shown in FIG. 6, the base member 122 may have a substantially rectangular shape and define an attaching face, generally indicated at 138, and a linking face, generally indicated at 140. The base member 122 is adapted to be assembled to a headliner, schematically indicated at 12, in any suitable manner. More specifically, the attaching face 138 is adapted to be mounted to the attachment area 39 of the headliner 12. To that end, as best shown in FIGS. 4, 6, 11, and 12, the attaching face 138 may include a plurality of substantially parallel, evenly spaced ribs 162 of substantially uniform thickness and width that may extend transversely the entire base member 122 and define grooves therebetween. The ribs 162 are adapted to be hot-plate welded or fastened by other similar means to the attachment area 39 of the headliner 12. On the other hand, each of the attaching face 138 and the headliner 12 may include a tongue-and-groove configuration such that the attaching face 138 is adapted to be complimentarily mounted to the headliner 12.

Alternatively and as shown in FIG. 7, the base member 122 can be injection-molded to include at least one clip, generally indicated at 164, which has a leg 166 and a foot 168. The clip 164 is formed as a part of the base member 122 and extends substantially perpendicularly from the attaching face 138 in a direction opposite the linking face 140. The clip 164 is adapted to be disposed through a corresponding hole formed in a substrate. The foot 168 of the clip 164 is adapted to engagingly contact the outer surface of the substrate distal the attaching face 138.

Alternatively and as shown in FIG. 8, a two-sided, pressure-sensitive adhesive 170 may be employed to adhere the attaching face 138 to the attachment area 39 of the headliner 12. Preferably, the adhesive is glue 170.

As best shown in FIG. 6, the linking face 140 of the base member 122 is substantially flat and includes a groove portion 152. The groove portion 152 is disposed on and extends above a substantially central portion of the linking face 140 and may extend transversely the entire linking face 140.

Figure 4:
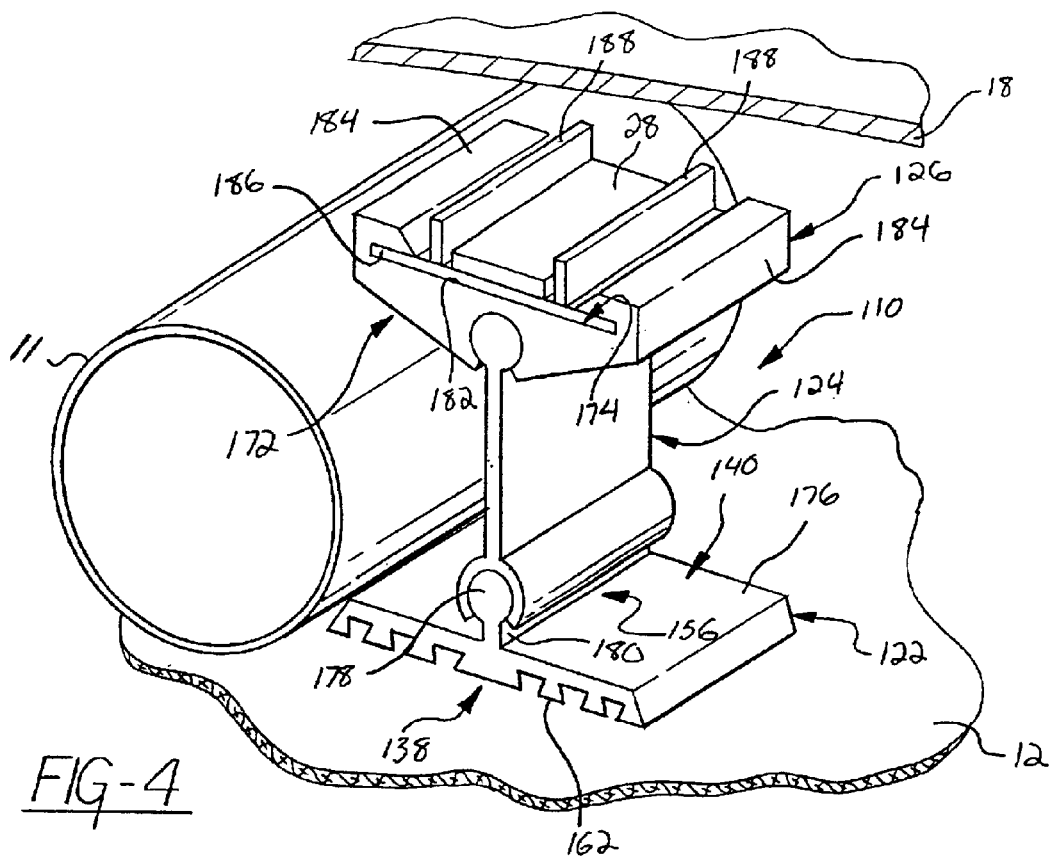
FIG. 4 is an exploded perspective view of another embodiment of the articulating fastener assembly of the present invention illustrating the base member, linking member, and carrier member of the articulating fastener assembly in the unassembled state of the headliner.

As best shown in FIGS. 4 and 6, the linking member 124 in this embodiment has a substantially rectangular shape. The width of the linking member 124 is substantially equal to the width of the base member 122 and the carrier member 126. However, those having ordinary skill in the art will appreciate that the linking member 124 can have any suitable shape and dimensions.

As best shown in FIG. 6, the carrier member 126 may have a substantially rectangular shape and defines a linking face, generally indicated at 172, and a carrying face, generally indicated at 174. The carrier member 126 is adapted to be assembled to the linking member 124 and the sheet metal 18 as will be described in greater detail below.

The linking face 172 presents a facial surface 176 and a male portion, generally indicated at 156. The male portion 156 includes a pole 178 and a co-extensive connecting portion 180, which is disposed between and connects the pole 178 and the facial surface 176. The male portion 156 is disposed on a substantially central portion of the facial surface 176 and extends transversely the entire facial surface 176. The pole 178 is adapted for mating engagement within the groove portion 152 of the linking member 124.

The carrying face 174 is substantially flat and presents a facial surface 182 and a plurality, preferably, a pair, of tabs 184. The carrying face 174 is adapted for attaching engagement with the attachment area 37 of the sheet metal 18. The tabs 184 are disposed substantially parallel with and opposite each other on and coextensively with respective transverse ends of the facial surface 182. Further, each of the tabs 184 is disposed in spaced parallel relationship with the facial surface 182 to define a channel between the tab 184 and the facial surface 182. Each channel is adapted to receive at least a portion of a bracket 186, best shown in FIG. 12, to mount the bracket 186 to the carrying face 174.

The bracket 186 is mounted to the facial surface 182 of the carrying face 174 and acts to support the fastening medium 128, such as a magnet. The longitudinal sides of the bracket 186 are received within the channels defined by the tabs 184. The bracket 186 may have a substantially rectangular shape and includes a pair of poles 188 disposed interiorly adjacent the tabs 184 on a substantially longitudinally central portion of the bracket 186. The poles 188 are generally made of the same material as is the bracket 186. The magnet 128 is adapted to be accepted and held by and on a substantially central portion of the bracket 186 between the poles 188 such that a space is defined between each pole 188 and the magnet 128. The tabs 184 exert a force on the bracket 186 in a direction toward the facial surface 182 while the magnet 128 exerts an attractive force with respect to the sheet metal 18. The bracket 186 can be made of any suitable material, such as a cold-roll steel plate.

The magnet 128 may have a substantially rectangular shape and generally has a smaller facial area than that of the bracket 186, although the size of the magnet 128 can vary. The magnet 128 generates a magnetic-flux to attach the carrier member 126 to the sheet metal 18. The magnetic flux has a magnetic-flux path that travels through the bracket 186, through one pole 188, through the sheet metal 18, through the other pole 188, through the magnet 128, and back through the bracket 186.

Figure 11:
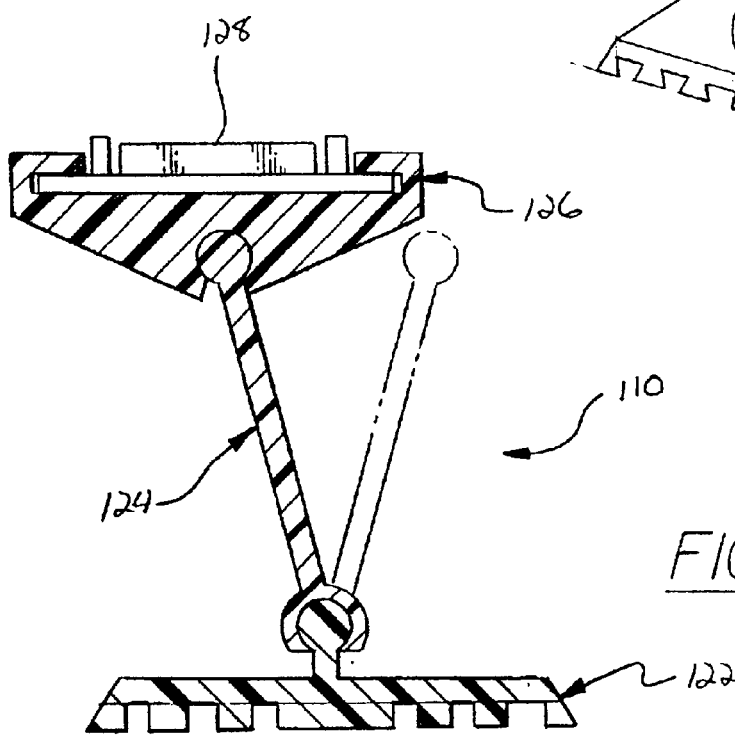
FIG. 11 is a schematic side view of another embodiment of the articulating fastener assembly of the present invention illustrating the range of pivot between the base member and the carrier member thereof.
Figure 12:
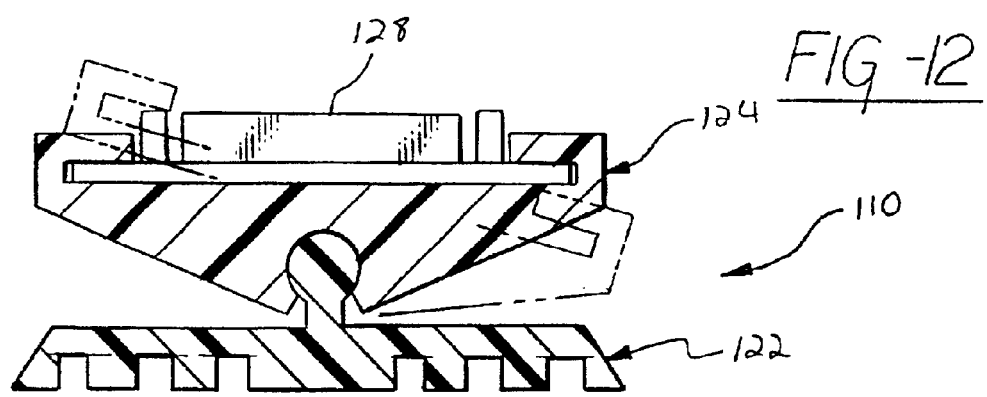
FIG. 12 is a schematic side view of the articulating fastener assembly of the present invention shown in FIG. 8 illustrating the variability of the articulation of the articulating fastener assembly.

As best illustrated in FIGS. 4 and 6, the carrier member 126 and the linking member 124 may be disposed substantially perpendicularly to each other while the base member 122 and the carrier member 126 are disposed substantially parallel with each other. However, as best shown in FIGS. 10 and 11, the linking member 124 can pivot about the axis defined by the rod portion 150 of the linking member 124 through continuously varying angles. In this manner, the carrier member 126 can be attached to the attachment area of the sheet metal 18 at varying angles in relation to the linking member 124.

Again, the extent of pivoting and articulation can be varied by narrowing and enlarging the opening 160 defining the pair of stop portions 158. The extent of pivoting and articulation can be varied also by adding stoppers, shoulders, or the like (not shown) to the groove portion 152 of the linking member 124 or the male portion 156 of the base member 122 and/or the carrier member 126 of various sizes to limit the range of pivotal and articulating motion of the linking member 124.

The linking member 124 can be interchanged with linking members 124 of various lengths. This way, a varying amount of space between the base member 122 and the carrier member 126, or the headliner 12 and the sheet metal 18, in the assembled state of the headliner 12 can be attained. The length of the linking member 124 may have to be sufficient to permit HVAC ductwork, shown at 11 in FIG. 1, for example, in the space between the headliner 12 and the sheet metal 18. Importantly, the linking member 124 does not stretch under the influence of heat.

Under circumstances requiring a minimal amount of space between the headliner 12 and the sheet metal 18, the carrier member 126 can be assembled directly to the base member 122 without the need for the linking member 124, as shown in FIG. 9. In particular, the pole 178 can be matingly received within the female portion 154 of the base member 122, for instance. As a result, articulation of the base member 122 and the carrier member 126 are retained.

Figure 14:
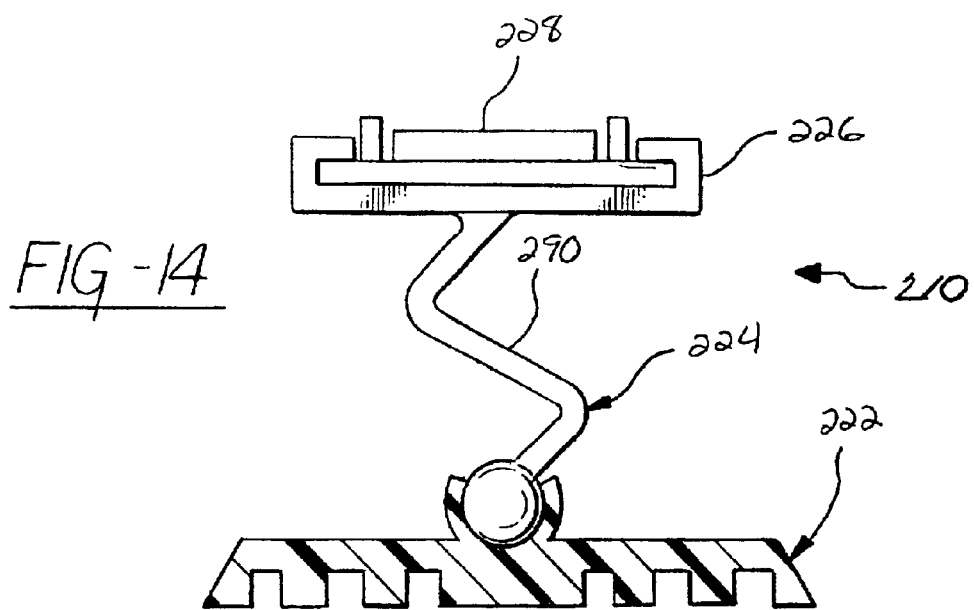
FIG. 14 is a side view of another embodiment of the articulating fastener assembly of the present invention illustrating a flexible, spring-like linking member having a modular connector.
Figure 15:
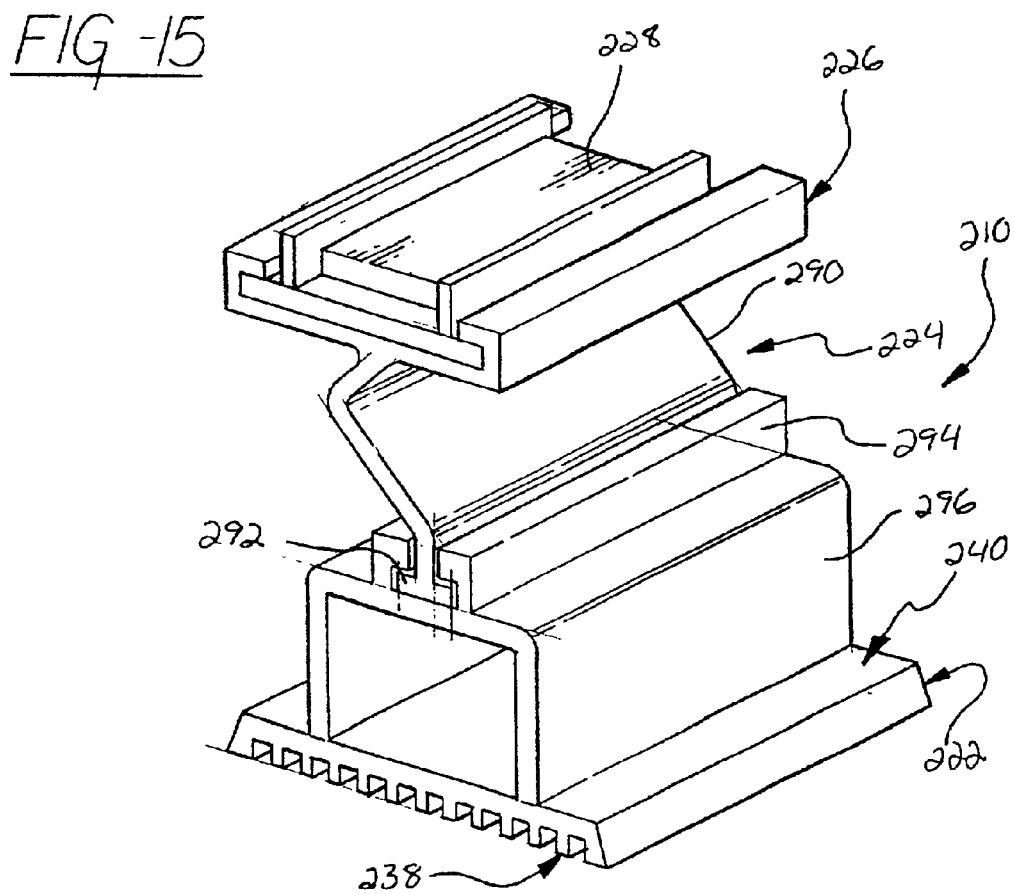
FIG. 15 is a perspective view of another embodiment of the articulating fastener assembly of the present invention that employs the linking member and carrier member of the articulating fastener assembly shown in FIG. 14.

Referring to FIGS. 14 and 15, another preferred embodiment of the fastener assembly is generally indicated at 210. Similar or like parts of the fastener assembly 210 have like reference numerals with respect to the fastener assembly 10 but increased by a factor of two hundred (200). Thus, the fastener assembly 210 includes a base member 222, a carrier member 226, and a linking member 224 extending therebetween and adapted to dispose the base member 222 and carrier member 226 in spaced relationship with respect to each other.

In this embodiment, the linking member 224 includes a spring 290 that provides the articulating movement of the base member 222 relative to the carrier member 226. The spring 290 has a substantially sinusoidal shape and is connected to and extends from a substantially transverse central portion of the carrier member 226. Preferably and as best shown in FIG. 15, the spring 290 is disposed longitudinally coextensively with the carrier member and includes a T-bar 292 formed at an end of the spring 290 opposite the carrier member 226. The base member 222 includes a T-slot 294 complimentary to the T-bar 292, which is adapted to be matingly received and secured within the T-slot 294. The spring 290 can take on many different shapes.

Figure 16:
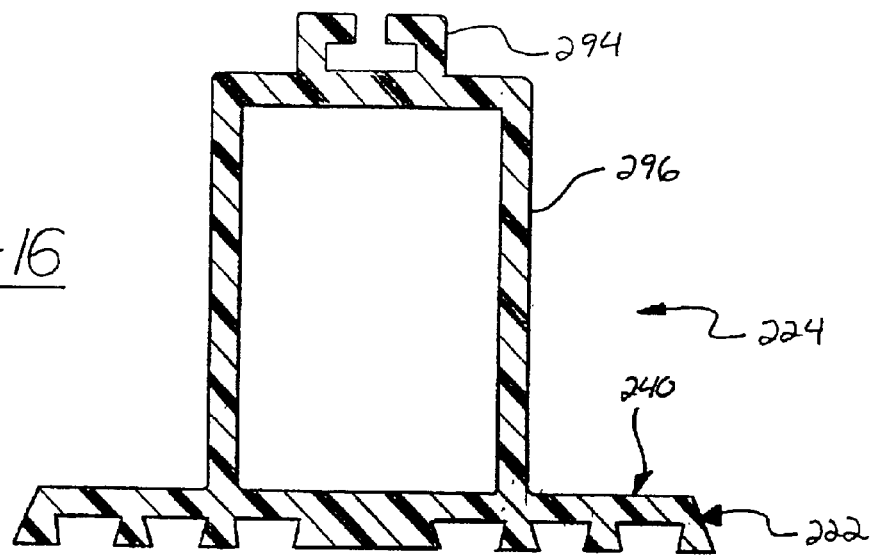
FIG. 16 is a cross-sectional side view of the articulating fastener assembly of the present invention illustrating one embodiment of a base member of the type in the articulating fastener assembly shown in FIG. 15 and having a particular height.

As shown in FIGS. 15 through 18, the base member 222 may include a box-like structure 296 including the T-slot 294. As best shown in FIG. 16, the box-like structure 296 is substantially hollow and connected to and extends from a substantially transverse central portion of the linking face 240 of the base member 222 opposite the attaching face 238. The box-like structure 296 is disposed longitudinally coextensively with the linking face 240. The T-slot 294 is connected to a substantially transverse central portion of the surface of the box-like structure 296 opposite the attaching face 238 and disposed outwardly of and longitudinally coextensively with the box-like structure 296. The spring 290 provides the fastener 210 with both articulating and pivotal capabilities.

Figure 17:
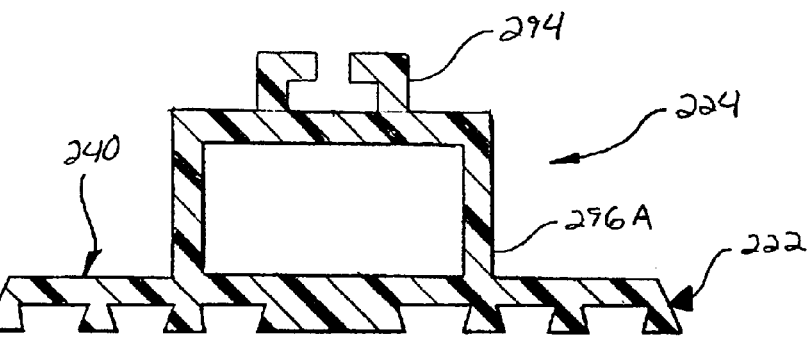
FIG. 17 is a cross-sectional side view of the articulating fastener assembly of the present invention illustrating another embodiment of a base member of the type in the articulating fastener assembly shown in FIG. 15 and having a height less than that of the base of the articulating fastener assembly shown FIG. 16.
Figure 18:
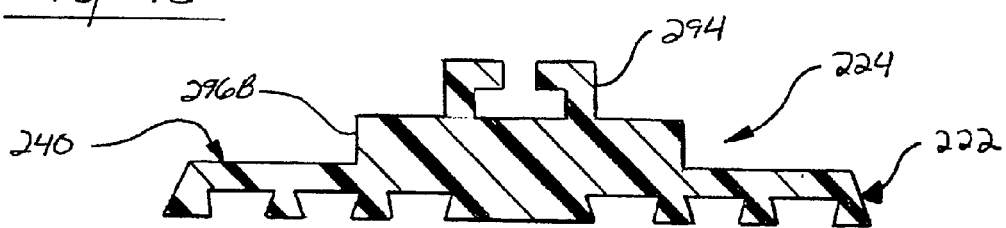
FIG. 18 is a cross-sectional side view of the articulating fastener assembly of the present invention illustrating another embodiment of a base member of the type in the articulating fastener assembly shown in FIG. 15 and having a height less than that of the base of the articulating fastener assembly shown FIG. 17.

As shown in FIGS. 16 through 18, the box-like structure 296 can be interchanged with box-like structures 296A and 296B having various sizes of the dimension from the linking face 240 of the base member 222 to the T-slot 294. This way, a varying amount of space between the base member 222 and the carrier member 226, or the headliner 12 and the sheet metal 18, in the assembled state of the headliner 12 can be attained. In addition, the boxlike structure 296 does not stretch under the influence of heat.

Figure 13:
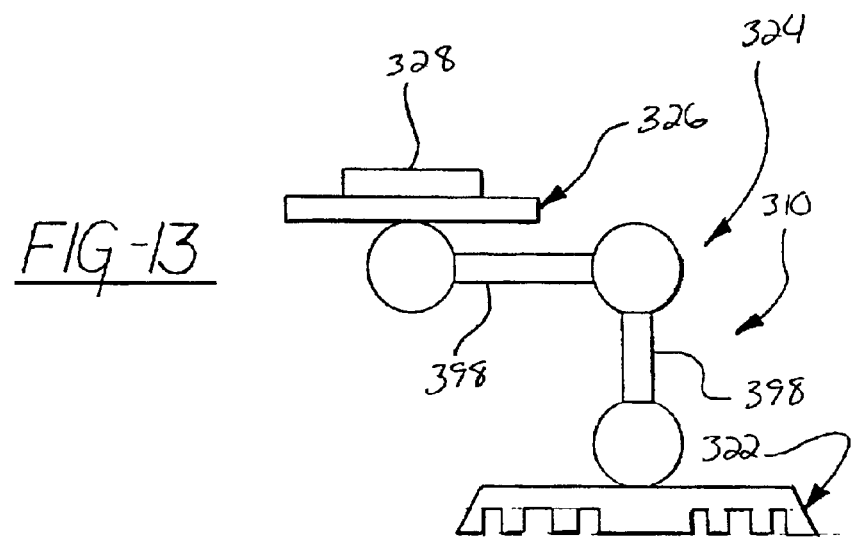
FIG. 13 is a side view of another embodiment of the articulating fastener assembly of the present invention in the assembled state thereof.

Referring to FIG. 13, another preferred embodiment of the fastener assembly is generally indicated at 310. Like or similar parts of the fastener assembly 310 have like reference numerals with respect to the fastener assembly 10 but increased by a factor of three hundred (300). Thus, the fastener assembly 310 includes a base member 322, a carrier member 326, and a linking member 324 extending therebetween and adapted to dispose the base member 322 and carrier member 326 in spaced relationship with respect to each other. In this embodiment, it can easily be seen that the linking member 324 includes a plurality of links 398 adapted to be connected to each other at various angles or in straight lines. This permits the fastener assembly 310 to pivot at various discrete angles, thereby accommodating not only obstructions such as duct work (not shown), but also a varying amount of space between the headliner 12 and the sheet metal 18 in the assembled state of the headliner 12. It should be appreciated by those having ordinary skill in the art that FIG. 14 illustrates the connection of the links 398 to each other. A male/female connection, for example, can be used to connect the links 398 to the base member 322 and the carrier member 326, as illustrated in FIG. 13.

To assemble the fastener assembly 10, 110, 210, 310 to the headliner 12, strategic positions for the attachment areas of the headliner 12 and the sheet metal 18 are determined. The base member 22, 122, 222, 322 of a fastener assembly 10, 110, 210, 310 is then attached to each attachment area of the headliner 12 such that the fastener assembly 10, 110, 210, 310 is secured to the headliner 12. Next, the fastener assembly 10, 110, 210, 310 is moved toward a corresponding attachment area of the sheet metal 18 with the face of the magnet 28, 128, 228, 328 substantially parallel with such attachment area. The magnet 28, 128, 228, 328 is magnetically attracted to the sheet metal 18 such that the fastener assembly 10, 110, 210, 310 is secured to the sheet metal 18. The ability of the base member 22, 122, 222, 322 and the carrier member 26, 126, 226, 326 to articulate allows the fastener assembly 10, 110, 210, 310 to make the attachment even if the respective attachment areas of the headliner 12 and the sheet metal 18 are curved. The ability of the linking member 24, 124, 224, 324 to pivot through various angles permits the fastener assembly 10, 110, 210, 310 to make the attachment even if the respective attachment areas of the headliner 12 and the sheet metal 18 are not aligned.

In operation, the fastener assembly 10, 110, 210, 310 acts to mount the headliner 12 to the sheet metal 18 while maintaining a space between them determined by the length of the linking member 24, 124, 224, 324. Since variously sized linking members 24, 124, 224, 324 can be interchangeably assembled to the base member 22, 122, 222, 322 and the carrier member 26, 126, 226, 326 various space requirements can be satisfied by using shorter or longer linking members 24, 124, 224, 324.

It is necessary that the magnetic attraction between the magnet 28, 128, 228, 328 and the sheet metal 18 be sufficiently strong to hold the magnet 28, 128, 228, 328 to the sheet metal 18. The carrier member 26 is designed to hold any type of magnet, including a neodymium magnet, as well as a ferrite magnet. However, it should be noted that a neodymium magnet is the strongest magnet manufactured in the world. U.S. Pat. Nos. 5,905,424; 5,725,792; 5,514,224; and 5,352,301 provide additional information on magnets of sufficient strength to secure the headliner 12 to the sheet metal 18. The strength of the magnet 28, 128, 228, 328 ultimately depends upon the attachment requirements.

Assembling and disassembling the headliner 12 using the fastener assembly 10, 110, 210, 310 does not damage the headliner 12 and is less time-consuming, less costly, and easier and requires less labor than when using some of the fastener assemblies known in the related art. Furthermore, when the headliner 12 is in the assembled state, the fastener assembly 10, 110, 210, 310 is not visible to passengers within the passenger compartment 14 of the automotive vehicle 16, and, thus, the headliner 12 is more aesthetically pleasing than when using some of the fastener assemblies known in the related art. Moreover, the fastener assembly 10 110, 210, 310 articulates such that it can conform to the contours of the headliner 12 and the sheet metal 18, pivots such that the attachment area 39 of the headliner 12 can be mounted to the attachment area 37 of the sheet metal 18 at varying angles, and permits a varying amount of space between the headliner 12 and the sheet metal 18. Meanwhile, the fastener assembly 10,110,210,310 does not stretch under the influence of heat, so the headliner 12 does not sag.

The present invention has been described in an illustrative manner. It is to be understood that the terminology that has been used is intended to be in the nature of words of description rather than of limitation.

Many modifications and variations of the present invention are possible in light of the above teachings. Therefore, within the scope of the appended claims, the present invention may be practiced other than as specifically described.

I claim:

1. A fastener assembly for securely fastening a decorative panel employed in the interior of a vehicle in variably spaced relation to a support backing of the vehicle, said fastener assembly comprising:

a base member adapted to be operatively mounted to the decorative panel, a carrier member, and a linking member operatively extending between said base member and said carrier member such that said base member is disposed spaced from said carrier member;

a fastening medium supported by said carrier member and adapted to operatively interconnect said carrier member to the support backing of the vehicle; and said linking member operatively interconnecting said base member and said carrier member in articulating fashion such that said base member is moveable relative to said carrier member and said fastener assembly can pivot to accommodate the structure of the support backing at varying angles and conform to the contours of the decorative panel and the support backing.

2. The fastener assembly as set forth in claim 1, wherein at least one of said base member and said carrier member is adapted to swivel through varying angles with respect to said linking member.

3. The fastener assembly as set forth in claim 1, wherein said linking member includes a pair of distal ends, one of said distal ends includes either one of a male end portion and a female end portion, and either one of said base member and said carrier member defines a complimentary female portion or male portion, said male end portion adapted to be received in said female portion and said female end portion adapted to receive said male portion such that said linking member interconnects said base member and said carrier member in articulating fashion.

4. The fastener assembly as set forth in claim 1, wherein said linking member includes a pair of distal ends, one of said distal ends includes either one of a male end portion and a female end portion and the other of said distal ends includes either one of a male end portion and a female end portion, and each one of said base member and said carrier member defines a complimentary female or male portion, said male end portion of said linking member adapted to be received in said female portion and said female end portion of said linking member adapted to receive said male portion such that said linking member interconnects said base member and said carrier member in articulating fashion.

5. The fastener assembly as set forth in claim 2, wherein said linking member includes a pair of distal ends, at least one of said distal ends defines a ball, and at least one of said base member and said carrier member defines a socket, said ball adapted to be complimentarily received in said socket to provide swiveling articulation of said base member relative to said carrier member.

6. The fastener assembly as set forth in claim 2, wherein said linking member includes a pair of distal ends, at least one of said distal ends defines a socket, and at least one of said base member and said carrier member defines a ball, said socket adapted to complimentarily receive said ball to provide swiveling articulation of said base member relative to said carrier member.

7. The fastener assembly as set forth in claim 2, wherein said linking member includes a pair of distal ends, one of said distal ends defines a ball and the other of said distal ends defines a socket, and either one of said base member and said carrier member defines a socket and the other one of said base member and said carrier member defines a ball, said ball of said linking member adapted to be complimentarily received in said socket of either one of said base member and said carrier member and said socket of said linking member adapted to complimentarily receive said ball of the other one of said base member and said carrier member to provide swiveling articulation of said base member relative to said carrier member.

8. The fastener assembly as recited in claim 1, wherein said carrier member includes a rim defining a channel interiorly to said rim and surrounding said fastening medium.

9. The fastener assembly as set forth in claim 1, wherein said linking member includes a pair of distal ends, one of said distal ends includes either one of a rod portion and a groove portion, and either one of said base member and said carrier member defines a complimentary female portion or male portion, said rod portion adapted to be received in said female portion and said groove portion adapted to receive said male portion such that said linking member interconnects said base member and said carrier member in articulating fashion.

10. The fastener assembly as set forth in claim 9, wherein said groove portion of said linking member or said female portion of either one of said base member and said carrier member defines a pair of stop portions such that said corresponding base member or carrier member can articulate through continuously varying angles between said stop portions.

11. The fastener assembly as set forth in claim 10, wherein said groove portion of said linking member or said female portion of either one of said base member and said carrier member includes a longitudinally extending circumferential opening that defines said pair of stop portions.

12. The fastener assembly as set forth in claim 9, wherein the longitudinal extent of said rod portion of said linking member or said groove portion of said linking member defines an axis about which said corresponding base member or carrier member can articulate.

13. The fastener assembly as set forth in claim 1, wherein said linking member includes a pair of distal ends, one of said distal ends includes either one of a rod portion and a groove portion and the other of said distal ends includes either one of a rod portion and a groove portion, and each one of said base member and said carrier member defines a complimentary female portion or male portion, said rod portion adapted to be received in said female portion and said groove portion adapted to receive said male portion such that said linking member interconnects said base member and said carrier member in articulating fashion.

14. The fastener assembly as set forth in claim 13, wherein each of said groove portion and said female portion defines a pair of stop portions such that each of said corresponding base member and carrier member can articulate through continuously varying angles between said stop portions.

15. The fastener assembly as set forth in claim 14, wherein each of said groove portion and said female portion includes a longitudinally extending circumferential opening that defines said pair of stop portions.

16. The fastener assembly as set forth in claim 13, wherein the longitudinal extent of each of said rod portion and said groove portion defines an axis about which said corresponding base member and carrier member can articulate.

17. The fastener assembly as recited in claim 1, wherein said linking member includes a spring that provides the articulating movement of said base member relative to said carrier member.

18. The fastener assembly as recited in claim 17, wherein said spring includes a T-bar formed at an end of said spring, said base member including a T-slot complimentary to said T-bar, said T-bar adapted to be matingly received and secured within said T-slot.

19. The fastener assembly as recited in claim 18, wherein said base member includes a box-like structure including said T-slot.

20. The fastener assembly as recited in claim 1, wherein said linking member includes a plurality of links adapted to be connected to each other at various angles for permitting said fastener assembly to pivot at various discrete angles, thereby accommodating a varying amount of space between the decorative panel and the support backing in the assembled state of the decorative panel.

21. The fastener assembly as set forth in claim 1, wherein said base member defines an attaching face adapted to be mounted to the decorative panel and a linking face adapted to be interconnected with said linking member, and said carrier member defines a carrying face adapted to carry said fastening medium to fasten said carrier member to the support backing of the vehicle and a linking face adapted to be interconnected with said linking member.

22. The fastener assembly as set forth in claim 21, wherein said attaching face includes a plurality of ribs and grooves defined between said plurality of ribs, said plurality of ribs adapted to be hot-plate welded to the support backing.

23. The fastener assembly as set forth in claim 21, wherein each of said attaching face and the decorative panel includes a tongue-and-groove configuration, said attaching face adapted to be complimentarily mounted to the decorative panel.

24. The fastener assembly as recited in claim 21, wherein said base member further includes at least one clip having a leg and a foot extending substantially perpendicularly from said attaching face in a direction opposite said linking face of said base member and adapted to be disposed through a respective hole formed in a substrate, said foot adapted to engagingly contact the outer surface of the substrate distal said attaching face.

25. The fastener assembly as recited in claim 21, further including an adhesive disposed between said attaching face and the decorative panel to adhere said base member to the decorative panel.

26. The fastener assembly as recited in claim 25, wherein said adhesive is glue.

27. The fastener assembly as recited in claim 21, further including a bracket mounted to said carrying face and acting to support said fastening medium.

28. The fastener assembly as recited in claim 27, wherein said carrying face includes a plurality of tabs that define a channel between said tabs and said carrying face, each channel being adapted to receive at least a portion of said bracket to mount said bracket to said carrying face.

29. The fastener assembly as recited in claim 27, wherein said bracket includes a pair of poles disposed interiorly adjacent said plurality of tabs on said bracket, said fastening medium adapted to be accepted and held by said bracket between said pair of poles such that a space is defined between each of said pair of poles and said fastening medium.

30. The fastener assembly as recited in claim 1, wherein said fastening medium is a magnet generating a magnetic-flux to attach said carrier member to the support backing, said magnetic flux having a magnetic-flux path that travels through said bracket, through one of said poles, through the support backing, through the other of said poles, through said magnet, and back through said bracket.

31. The fastener assembly as recited in claim 1, wherein said fastening medium is selected from the group consisting of a magnet, Velcro®, and Dual-Lock®.

32. A fastener assembly for securely fastening a decorative panel employed in the interior of a vehicle in variably spaced relation to a support backing of the vehicle, said fastener assembly comprising:

a base member adapted to be operatively mounted to the decorative panel;

a carrier member;

a linking member operatively extending between said base member and said carrier member such that said base member is disposed spaced from said carrier member; and a fastening medium supported by said carrier member and adapted to operatively interconnect said carrier member to the support backing of the vehicle;

said linking member operatively interconnecting said base member and said carrier member and including a pair of distal ends, at least one of said distal ends defining a ball, and at least one of said base member and said carrier member defining a socket, said ball adapted to be complimentarily received in said socket to provide swiveling articulation of said base member relative to said carrier member such that said fastener assembly can pivot to accommodate the structure of the support backing at varying angles and conform to the contours of the decorative panel and the support backing.

* * * * *